Patented Nov. 6, 1928.

1,690,099

UNITED STATES PATENT OFFICE.

FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

LITHOPONE.

No Drawing.  Application filed December 29, 1926. Serial No. 157,864.

This invention relates to the manufacture of lithopone and has for its object the provision of certain improvements in lithopone manufacture.

Lithopone is a white pigment composed of zinc sulfide and barium sulfate. The normal lithopones of commerce contain from 27 to 30% zinc sulfide and about 70% barium sulfate. The hiding power or strength of lithopone, as a paint pigment, is due almost entirely to its zinc sulfide content; the barium sulfate functioning merely as a white, inert diluent. Lithopones of increased hiding power may be, and have heretofore been, made by increasing the zinc sulfide content. This may be done by mechanically mixing zinc sulfide with normal lithopone or by appropriately increasing the ratio of zinc sulfide to barium sulfate in the precipitation of the crude lithopone.

In the manufacture of normal lithopone, aqueous solutions of zinc sulfate ($ZnSO_4$) and barium sulfide (BaS) are mixed in about molecular proportions. Upon the mixing of these solutions there results a heavy, flocculent white precipitate consisting of an intimately associated admixture of zinc sulfide (ZnS) and barium sulfate ($BaSO_4$). The co-precipitate of zinc sulfide and barium sulfate is washed, filter-pressed and dried. The dried product is known in the industry as "crude lithopone". Crude lithopone is not suitable for paint purposes, but when it is heated, say to a temperature of 650–900° C., and suddenly cooled by plunging (quenching) into cold water, its physical properties are so modified as to adapt it for paint purposes.

The ratio of zinc sulfide to barium sulfate may be increased by replacing a certain amount of the zinc sulfate solution with zinc chloride solution. In such a case the chemical reaction taking place during the precipitating stage may be represented as follows:

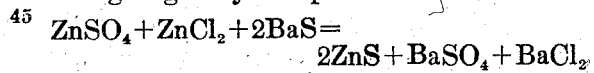

$$ZnSO_4 + ZnCl_2 + 2BaS = 2ZnS + BaSO_4 + BaCl_2$$

The barium chloride ($BaCl_2$) is soluble in the crude lithopone pulp and is separated from the coprecipitate of zinc sulfide and barium sulfate by decantation and filtration.

The present invention relates particularly to the manufacture of lithopone of relatively high hiding power by increasing the ratio of zinc sulfide to barium sulfate in the precipitation of the crude lithopone. The invention involves the regulation and control of certain manipulative steps and conditions in the manufacturing process which singly or in combination effect or influence the quality or properties of the finished lithopone. Thus, the invention, in its preferred and complete aspect, involves (1) the separate preparation and purification of the zinc sulfate and zinc chloride solutions; (2) the establishment of a predetermined excess of sulfide or sulfhydrate in the crude pulp at the endpoint of the precipitating step; (3) prompt dilution of the crude lithopone pulp and subsequent washing of the coprecipitate of zinc sulfide and barium sulfate until the chlorine content of the water in which the crude lithopone finally remains suspended is reduced to a predetermined minimum amount; (4) the establishment of a predetermined hydrate content in the water in which the crude lithopone finally remains suspended; (5) charging the dried crude lithopone to the calcining apparatus with an average moisture content of from 4 to 10% and (6) calcining the lithopone at a temperature sufficiently high to give the desired strength but not higher than the temperature at which the lithopone loses its resistance to light to an objectionable extent for paint purposes. These conditions will be better understood from the following detailed explanation and description of the invention.

The zinc sulfate solution is prepared and purified in the manner customary in lithopone manufacture. The zinc chloride solution may be prepared by dissolving fused commercial zinc chloride in water or by dissolving appropriate zinc-bearing materials in hydrochloric acid. The resulting zinc chloride solution is purified in any appropriate manner, as, for example, by treatment with bleaching powder or permanganate for the elimination of iron and manganese, followed by treatment with zinc dust and sheet zinc and/or slab zinc for the elimination of the heavy metals. We have found it desirable to separately prepare and purify the zinc sulfate and zinc chloride solutions. In our preferred practice, the zinc sulfate solution is about 20° Bé. and the zinc chloride solution is about 25° Bé.

The barium sulfide solution is preferably prepared with a relatively high ratio of hydrate to sulfhydrate. Various expedients for controlling the ratio of hydrate to sulfhydrate in the barium sulfide solution are described in the copending patent applications of William C. Hooey, Serial Nos. 75,621 and 75,622, filed December 15, 1925.

Predetermined amounts of the purified zinc sulfate and zinc chloride solutions are introduced into the precipitating tank. In the preparation of a lithopone containing about 50% zinc sulfide, we add approximately 628 pounds of zinc sulfate solution of 20° Bé. and approximately 997 pounds of zinc chloride solution of 25° Bé. per ton of finished lithopone. In our preferred practice, the equivalent of about 27 pounds of 100% sulphuric acid is added to the precipitating tank along with the zinc liquors in the amounts specified. The barium sulfide solution is gradually added to the precipitating tank with constant stirring until the titration tests show that the desired reactions have been completed. In the example under consideration, approximately 1890 pounds of barium sulfide solution of 14° Bé. will be necessary per ton of finished lithopone.

The liquors in the precipitating tank are maintained at a temperature of about 50 to 60° C. and are constantly stirred for from 1½ to 2 hours. The endpoint of the precipitating reaction is determined by titrating the filtrate from a sample of the crude pulp with 0.1N (one-tenth normal) iodine solution (iodine dissolved in an aqueous solution of potassium iodide). This titration test indicates and establishes a predetermined excess of sulfide or sulfhydrate in the precipitating liquors at the endpoint or completion of the reaction. In our preferred practice, 25 cc. of the filtrate from a sample of the crude pulp is titrated with 0.1N iodine solution, and the endpoint is reached and determined when from 0.5 to 1.0 cc. of the iodine solution is used in the titration test. These particular figures for the titration test apply to a zinc sulfate solution of about 20° Bé., a zinc chloride solution of about 25° Bé. and a barium sulfide solution of about 14° Bé. It is to be understood that the invention is not limited to the use of solutions of these particular concentrations. What the invention contemplates in this respect is an excess of sulfide or sulfhydrate in the crude pulp at the endpoint of the precipitating step substantially equivalent to the figures specified.

When the precipitating reaction is completed, the crude lithopone pulp is diluted with one part of water per one part of pulp. This dilution with water should take place within about 2 hours after the completion of the precipitating reaction. After dilution with water, the pulp can stand almost indefinitely without injurious effects.

The dilution with water reduces the chlorine concentration per unit volume of the crude pulp. Before dilution the chlorine concentration in the crude pulp is such that objectionable amounts of chloride are adsorbed by the precipitate, notably by the barium sulfate. This adsorbed chloride is then carried over to the calcining operation and deleteriously affects the light resistance of the calcined product.

The diluted pulp is next allowed to settle and the supernatant liquor is decanted off in amount substantially equivalent to the amount of diluting water added. The resulting crude pulp is again diluted and again subjected to sedimentation and decantation and these steps are repeated until the chlorine content of the water in which the crude lithopone is suspended is not more than 0.5 grams of chlorine per liter, and preferably from 0.1 to 0.2 grams per liter. In practice, under the conditions hereinbefore specified, we have found that about 6 dilutions are necessary to reduce the chlorine content to the desired optimum figure. If desired, the crude pulp, after the initial dilution, may be washed by countercurrent decantation.

At the conclusion of the washing operation, a predetermined hydrate content is established in the crude pulp. This is preferably accomplished by adding barium hydrate ($Ba(OH)_2$) to the crude pulp until titration tests indicate the desired hydrate content. The hydrate content established in the pulp will depend, to some extent, upon the degree of moisture to be left in the dried crude lithopone. Thus, when in the subsequent drying operation substantial percentages (say 4 to 10%) of moisture are to be left in the dried crude lithopone, the predetermined hydrate content of the crude pulp may be lower than when the drying is conducted to produce a dried crude lithopone of 1%, or less, moisture.

The hydrate determination may advantageously be made by titrating the filtrate of a sample of the crude pulp with 0.25N (one-fourth normal) hydrochloric acid (HCl). After the final decantation, barium hydrate is added to the crude pulp until titration tests indicate the desired predetermined excess of hydrate. Where the subsequent drying operation is so conducted that the dried crude lithopone contains about 1%, or less, of moisture, the desired predetermined hydrate content is established in the crude pulp when from 5.5 to 7.0 cc. of 0.25N hydrochloric acid are required for the neutralization of 250 cc. of the filtrate from a sample of the pulp. In our preferred practice, the moisture content of the dried crude lithopone is from 4 to 10%, and in this case the desired predetermined hydrate content is established in the crude pulp when from 2.5 to 4.0 cc. of 0.25N hydrochloric acid are used in the titration test.

The crude pulp, after dilution, washing, final decantation, and establishment of hydrate content, as hereinbefore described, is filter-pressed in the usual manner. In accordance with our preferred practice, the press-cake from the crude pulp filters contains about 40–50% moisture or water. The press-cake is dried in any appropriate apparatus, but the drying operation is preferably so conducted and controlled as to leave an average of not less than 4%, and preferably an average of from 5 to 8%, of moisture or water in the dried crude lithopone.

The dried crude lithopone is preferably calcined in an apparatus of the vertical retort type such as described in the United States patent of Singmaster and Breyer, No. 1,411,647, dated April 4, 1922. The temperature of calcination is preferably about 650 to 725° C. The calcined lithopone is subjected to further treatment, such as washing, grinding, drying and disintegrating, substantially in accordance with the present customary practice.

In the practice of our present invention, we prefer to impart to the finished lithopone that predetermined degree of alkalinity described and claimed in our U. S. Patent No. 1,446,637, dated February 27, 1923. With the hydrate content of the crude pulp and other conditions and manipulative steps controlled as hereinbefore described the finished lithopone should have this desired degree of alkalinity without the use of any additive agent. When necessary, however, control of the alkalinity of the finished lithopone may be promoted by any of the methods described in our Patent No. 1,446,637, or in any other appropriate or equivalent manner.

We have found that the separate preparation and purification of the zinc sulfate and zinc chloride solutions is important. When large quantities of zinc chloride are mixed with zinc sulfate and the mixed solution is rendered basic, which is the best condition for the separation of iron and manganese, basic zinc salts are thrown out of solution along with the iron and manganese slime, thus changing in an irregular manner the zinc content of the solution as well as occasioning a loss of valuable zinc material. This loss of zinc results in the production of a lithopone of lower hiding power than would be expected from the original amounts of zinc sulfate and zinc chloride in the mixed solution. Such variations in the zinc content of the zinc liquors with its attendant loss of zinc are avoided by the separate preparation and purification of the zinc sulfate and zinc chloride solutions.

The dilution, washing and final hydrate content of the crude lithopone pulp are important features of the invention. The dilution should be promptly effected after the completion of the precipitating step. We prefer to dilute the crude pulp with an equal volume of water immediately after, and at least within two hours after, the completion of the precipitating step. The washing of the crude lithopone precipitate may be effected in any appropriate manner as by repeated decantations and dilutions, or by countercurrent decantation, the object being to reduce the chlorine content of the water in which the crude lithopone is finally suspended to the desired predetermined value. The hydrate content of the water in which the crude lithopone is finally suspended is then established within the limits hereinbefore specified. The chlorine and hydrate determinations are made at the same stage of the operations, and indicate the chlorine and hydrate contents of the water in which the lithopone is suspended when the crude pulp is fed to the filter presses.

The lithopone should be alkaline when discharged from the calcining apparatus. When the lithopone comes through the calcining apparatus neutral or acid, it is an indication that oxidation has taken place in either the drying or calcining operation, and the light resistance of the lithopone is thereby deleteriously affected. An excessive amount of barium sulfhydrate in the water in which the crude lithopone is finally suspended, prior to filtration, tends to destroy or inhibit the desired degree of alkalinity in the calcined lithopone. Barium sulfhydrate is readily converted into acidic substances upon oxidation, and it is therefore important to avoid not only excessive amounts of barium sulfhydrate but also oxidizing conditions in the drying and more particularly in the calcining of the lithopone. When the excess of barium sulfide or barium sulfhydrate in the precipitating liquors at the endpoint of the precipitating step is determined within the limits hereinbefore specified, the amount of sulfhydrate radical in the water in which the crude lithopone is finally suspended is insignificant, in conjunction with the other conditions described, in its influence upon the desired alkalinity of the calcined lithopone. The alkalinity of the calcined lithopone may conveniently be tested by taking a sample from the quenching tubs and shaking phenolphthalein thereon. The sample should show a uniform alkalinity, that is, uniform throughout rather than alkaline in spots.

In the calcination of lithopone in vertical muffles of the type described in U. S. Patent No. 1,411,647, it is desirable that the lithopone be raised to the desired calcining temperature while in an atmosphere of superheated steam. Such calcination of the lithopone in an atmosphere of superheated steam exerts a favorable influence on the light resistance and color of the finished product. Where the dried crude lithopone contains 4% or more of moisture, the desired atmosphere of superheated steam is established and maintained by the water vapor driven off from the lithopone in the course of the calcining operation. We have found that the optimum results are attained when the atmosphere of superheated steam is provided in this manner. When the mositure content of the dried crude lithopone is insufficient to provide this desired calcining atmosphere of superheated steam, it is advisable to introduce dry steam into the muffles just above the star discharge valves. Such introduction of steam assists in maintaining the alkalinity of the lithopone during the clacining operation as well as providing the other advantages of a superheated steam atmosphere.

In the foregoing explanation of the actual practice of the invention, we have described the determination of the endpoint of the precipitating step by titrating for excess barium sulfide. For economic reasons, we now prefer to determine the endpoint within the relatively narrow limits hereinbefore described. This is not, however, necessary or essential for the control of the properties of the finished product in accordance with the principles of the present invention. From the standpoint of the control of the properties of the finished product, the titration limits hereinbefore given for the hydrate excess at the termination of the washing operation are highly important, and should be carefully observed irrespective of the procedure used for determining the endpoint of the precipitating step.

We claim:

1. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

2. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, diluting the resulting crude lithopone pulp with water promptly after the completion of the precipitating step, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

3. The improvement in the manufacture of lithophone which comprises separately preparing and purifying solutions of zinc sulfate and zinc chloride, precipitating the crude lithopone by mixing said purified solutions of zinc sulfate and zinc chloride with barium sulfide solution, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

4. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, diluting the resulting crude lithopone pulp with water promptly after the completion of the precipitating step, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

5. The improvement in the manufacture of lithopone which comprises precipitating the crude lithopone by mixing solutions of barium sulfide, zinc sulfate and zinc chloride, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

6. The improvement in the manufacture of lithopone which comprises precipitating the crude lithopone by mixing solutions of barium sulfide, zinc sulfate and zinc chloride, diluting the resulting crude lithopone pulp with water promptly after the completion of the precipitating step, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

7. The improvement in the manufacture of lithopone which comprises precipitating the crude lithopone by mixing solutions of barium sulfide, zinc sulfate and zinc chloride, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

8. The improvement in the manufacture of lithopone which comprises precipitating the crude lithopone by mixing solutions of barium sulfide, zinc sulfate and zinc chloride, diluting the resulting crude lithopone pulp with water promptly after the completion of the precipitating step, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

9. The improvement in the manufacture of lithopone which comprises precipitating the crude lithopone by mixing solutions of barium sulfide, zinc sulfate and zinc chloride, establishing in the resulting crude lithopone pulp at the endpoint of the precipitating step a predetermined sulfhydrate excess, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

10. The improvement in the manufacture of lithopone which comprises precipitating the crude lithopone by mixing solutions of barium sulfide, zinc sulfate and zinc chloride, establishing in the resulting crude lithopone pulp at the endpoint of the precipitating step a predetermined sulfhydrate excess, diluting the crude lithopone pulp with water promptly after the completion of the precipitating step, washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

11. The improvement in the manufacture of lithopone which comprises precipitating the crude lithopone by mixing solutions of barium sulfide, zinc sulfate and zinc chloride, establishing in the resulting crude lithopone pulp at the endpoint of the precipitating step a predetermined sulfhydrate excess, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

12. The improvement in the manufacture of lithopone which comprises precipitating the crude lithopone by mixing solutions of barium sulfide, zinc sulfate and zinc chloride, establishing in the resulting crude lithopone pulp at the endpoint of the precipitating step a predetermined sulfhydrate excess, diluting the resulting crude lithopone pulp with water promptly after the completion of the precipitating step, washing the crude lithopone until the chlorine content of the liquor in which the crude lithopone is suspended does not exceed 0.5 grams per liter, and calcining the lithopone (after appropriate drying) at a temperature sufficiently high to give the desired strength but not higher than the temperature at which the lithopone loses its resistance to light to an objectionable extent for paint purposes.

13. The improvement in the manufacture of lithopone which comprises precipitating the crude lithopone by mixing solutions of barium sulfide, zinc sulfate and zinc chloride, washing the crude lithopone until the chlorine content of the liquor in which the crude lithopone is suspended does not exceed a predetermined amount, establishing a predetermined hydrate content in the liquor in which the crude lithopone is finally suspended after the washing operation, and calcining the lithopone (after appropriate drying) at a temperature sufficiently high to give the desired strength but not higher than the temperature at which the lithopone loses its resistance to light to an objectionable extent for paint purposes.

14. The improvement in the manufacture of lithopone which comprises precipitating the crude lithopone by mixing solutions of barium sulfide, zinc sulfate, and zinc chloride, establishing in the resulting crude lithopone pulp at the endpoint of the precipitating step a predetermined sulfhydrate excess, washing the crude lithopone, establishing a predetermined hydrate content in the liquor in which the crude lithopone is finally suspended after the washing operation, and calcining the lithopone (after appropriate drying) at a temperature sufficiently high to give the desired strength but not higher than the temperature at which the lithopone loses its resistance to light to an objectionable extent for paint purposes.

15. The improvement in the manufacture of lithopone which comprises precipitating the crude lithopone by mixing solutions of barium sulfide, zinc sulfate and zinc chloride, washing the crude lithopone, establishing a predetermined hydrate content in the liquor in which the crude lithopone is finally suspended after the washing operation, and calcining the lithopone (after appropriate drying) at a temperature sufficiently high to give the desired strength but not higher than the temperature at which the lithopone loses its resistance to light to an objectionable extent for paint purposes.

16. The improvement in the manufacture of lithopone which comprises precipitating the crude lithopone by mixing solutions of barium sulfide, zinc sulfate and zinc chloride, washing the crude lithopone, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after appropriate drying) at a temperature sufficiently high to give the desired strength but not higher than the temperature at which the lithopone loses its resistance to light to an objectionable extent for paint purposes.

17. The improvement in the manufacture of lithopone which comprises precipitating the crude lithopone by mixing solutions of barium sulfide, zinc sulfate and zinc chloride, establishing in the crude pulp at the endpoint of the precipitating step a predetermined sulfhydrate excess equivalent to 0.5 to 1.0 cc. of 0.1N iodine solution per 25 cc. of filtrate determined by titration of the filtrate from a sample of crude pulp precipitated at a temperature of 50-60° C. from a zinc sulfate solution of about 20° Bé. and a zinc chloride solution of about 25° Bé. and a barium sulfide solution of about 14° Bé., washing the crude lithopone until the chlorine content of the liquor in which the crude lithopone is suspended does not exceed a predetermined amount, and calcining the lithopone (after appropriate drying) at a temperature sufficiently high to give the desired strength but not higher than the temperature at which the lithopone loses its resistance to light to an objectionable extent for paint purposes.

18. The improvement in the manufacture of lithopone which comprises precipitating the crude lithopone by mixing solutions of barium sulfide, zinc sulfate and zinc chloride, establishing in the crude pulp at the endpoint of the precipitating step a predetermined sulfhydrate excess equivalent to 0.5 to 1.0 cc. of 0.1N iodine solution per 25 cc. of filtrate determined by titration of the filtrate from a sample of crude pulp precipitated at a temperature of 50-60° C. from a zinc sulfate solution of about 20° Bé. and a zinc chloride solution of about 25° Bé. and a barium sulfide solution of about 14° Bé., establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after appropriate drying) at a temperature sufficiently high to give the desired strength but not higher than the temperature at which the lithopone loses its resistance to light to an objectionable extent for paint purposes.

19. The improvement in the manufacture of lithopone which comprises precipitating the crude lithopone by mixing solutions of barium sulfide, zinc sulfate and zinc chloride, establishing in the crude pulp at the endpoint of the precipitating step a predetermined sulfhydrate excess, washing the resulting crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after appropriate drying) at a temperature of about 650 to 725° C.

20. The improvement in the manufacture of lithopone which comprises precipitating the crude lithopone by mixing solutions of barium sulfide, zinc sulfate and zinc chloride, diluting the resulting crude lithopone pulp with water promptly after the completion of the precipitating step, washing the crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after 21. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, establishing in the crude pulp at the end point of the precipitating step a predetermined sulfhydrate excess, washing the crude lithopone until the chlorine content of the liquor in which the crude lithopone is suspended does not exceed a predetermined amount, establishing a predetermined hydrate content in the liquor in which the crude lithopone is finally suspended after the washing operation, and calcining the lithopone (after appropriate drying) at a temperature sufficiently high to give the desired strength but not higher than the temperature at which the lithopone loses its resistance to light to an objectionable extent for paint purposes.

22. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, diluting the resulting crude lithopone pulp with water promptly after the completion of the precipitating step, washing the crude lithopone until the chlorine content of the liquor in which the crude lithopone is suspended does not exceed a predetermined amount, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after appropriate drying) at a temperature sufficiently high to give the desired strength but not higher than the temperature at which the lithopone loses its resistance to light to an objectionable extent for paint purposes.

23. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, washing the resulting crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, and calcining the lithopone (after appropriate drying) at a temperature of about 650 to 725° C.

24. The improvement in the manufacture of lithophone which comprises separately preparing and purifying solutions of zinc sulfate and zinc chloride, precipitating the crude lithopone by mixing said purified solutions of zinc sulfate and zinc chloride with barium sulfide solution, establishing in the crude pulp at the endpoint of the precipitating step a predetermined sulfhydrate excess equivalent to 0.5 to 1.0 cc. of 0.1N iodine solution per 25 cc. of filtrate determined by titration tests of the filtrate from a sample of crude pulp precipitated at a temperature of 50–60° C. from a zinc sulfate solution of about 20° Bé. and a zinc chloride solution of about 25° Bé. and a barium sulfide solution of about 14° Bé., diluting the resulting crude lithopone pulp with water promptly after the completion of the precipitating step, washing the crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of fitrate determined by titration of the filtrate from a sample of the pulp, and calcining the lithopone (after appropriate drying) at a temperature of about 650 to 725° C.

25. The improvement in the manufacture of lithopone which comprises precipitating the crude lithopone by mixing solutions of barium sulfide, zinc sulfate and zinc chloride, washing the crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, charging the dried crude lithopone to a calcining apparatus with an average moisture content of not less than 4%, and calcining the lithopone at a temperature of about 650 to 725° C.

26. The improvement in the manufacture of lithopone which comprises separately preparing and purifying solutions of zinc sulfate and zinc chloride, precipitating the crude lithopone by mixing said purified solutions of zinc sulfate and zinc chloride with barium sulfide solution, establishing in the crude pulp at the endpoint of the precipitating step a predetermined sulfhydrate excess, diluting the resulting crude lithopone pulp with water promptly after the completion of the precipitating step, washing the crude lithopone until the chlorine content of the liquor in which the crude lithopone is suspended does not exceed 0.5 grams per liter, establishing in the liquor in which the crude lithopone is finally suspended after the washing operation a predetermined hydrate content equivalent to 2.5 to 7.0 cc. of 0.25N hydrochloric acid per 250 cc. of filtrate determined by titration of the filtrate from a sample of the pulp, charging the dried crude lithopone to a calcining apparatus with an average moisture content of from about 5 to 8%, and calcining the lithopone at a temperature of about 650 to 725° C.

In testimony whereof we affix our signatures

FRANK G. BREYER.
CLAYTON W. FARBER.